United States Patent
Saito et al.

(10) Patent No.: US 8,037,870 B2
(45) Date of Patent: Oct. 18, 2011

(54) FUEL ECONOMY IMPROVEMENT ASSIST DEVICE AND METHOD OF FUEL ECONOMY IMPROVEMENT ASSIST

(75) Inventors: Kan Saito, Okazaki (JP); Osamu Komeda, Mishima (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 205 days.

(21) Appl. No.: 12/306,971

(22) PCT Filed: Jan. 18, 2008

(86) PCT No.: PCT/IB2008/000112
§ 371 (c)(1),
(2), (4) Date: Dec. 30, 2008

(87) PCT Pub. No.: WO2008/087541
PCT Pub. Date: Jul. 24, 2008

(65) Prior Publication Data
US 2009/0288636 A1 Nov. 26, 2009

(30) Foreign Application Priority Data
Jan. 19, 2007 (JP) ................................ 2007-010622

(51) Int. Cl.
*F02M 51/00* (2006.01)
*F02D 41/00* (2006.01)

(52) U.S. Cl. ...................................................... 123/492

(58) Field of Classification Search .................. 123/399, 123/349, 350, 492, 493; 701/70, 110, 123; 73/114.53
See application file for complete search history.

(56) References Cited

U.S. PATENT DOCUMENTS

| 4,475,380 | A  * | 10/1984 | Colovas et al. ............ 73/114.53 |
| 7,010,408 | B2 * | 3/2006  | Kitazawa et al. ............... 701/70 |
| 7,016,803 | B2 * | 3/2006  | Kitazawa ....................... 702/142 |
| 2002/0133288 | A1 * | 9/2002 | Minami et al. ................ 701/114 |
| 2004/0128057 | A1 * | 7/2004 | Kitazawa et al. ............. 701/110 |

FOREIGN PATENT DOCUMENTS

| DE | 10 2007 016 618 A1 | 10/2007 |
| JP | 03-092568 A | 4/1991 |
| JP | 2002-370560 A | 12/2002 |
| JP | 2003-220851 A | 8/2003 |
| JP | 2006-321364 A | 11/2006 |

* cited by examiner

*Primary Examiner* — Mahmoud Gimie
(74) *Attorney, Agent, or Firm* — Sughrue Mion, PLLC

(57) ABSTRACT

A fuel economy improvement assist device (1) has: accelerator operation amount detection means (12); and display control means (15a) for displaying, on a display device (20), a target value corresponding to a target accelerator operation amount and a deviation value of the detected accelerator operation amount from the target accelerator operation amount (14a). The display control means (15a) calculates an accelerator depression speed based on the detected accelerator operation amount, and variably displays the deviation value in accordance with the calculated accelerator depression speed.

9 Claims, 11 Drawing Sheets

FUEL ECONOMY IMPROVEMENT ASSIST DEVICE AND METHOD OF FUEL ECONOMY IMPROVEMENT ASSIST

BACKGROUND OF THE INVENTION

1. Field of the Invention

The present invention relates to a fuel economy improvement assist device and a method of improving fuel economy by displaying the accelerator operation amount to a driver.

2. Description of the Related Art

In order to reduce the fuel consumption, various driving techniques such as avoiding sudden starting and acceleration, constant-speed driving, using higher gears, stopping engine idling are recommended. While many drivers keep the fuel economy in mind when driving, display devices that are used to display information to the drivers for improving fuel economy to further reduce the fuel consumption are known as below.

Japanese Patent Application Publication No. 2003-220851 (hereinafter referred to as "JP-A-2003-220851") describes a display device that it is determined whether the actual operation is suitable for improving fuel economy when the driver selected a gearshift mode for improving fuel economy, and then a lamp is turned on when the actual operation is suitable for improving fuel economy. On the other hand, the lamp is turned off when the actual operation is not suitable for improving fuel economy. Therefore, the driver may be encouraged to operate suitably for improving fuel economy.

Japanese Patent Application Publication No. 2002-370560 (hereinafter referred to as "JP-A-2002-370560") describes a display device that compares a calculated present fuel consumption to a recommended driving pattern specific to each vehicle, and then displays appropriate accelerator operation manners (i.e., appropriate, should be stopped, or over-depressed) in different colors. Therefore, the driver may be encouraged to operate appropriately after recognizing the displayed color.

However, the display device described in JP-A-2003-220851 merely determines a driving operation, and turns on and off the lamp. Thus, the displayed information may be insufficient. Because the lamp indicates only whether the driving operation is suitable for improving the fuel economy but provides no indication of the accelerator depression amount until the threshold for turning on or off the lamp is reached. Accordingly, the driver is not aware of how much further the accelerator pedal may be depressed. Therefore, even drivers who keep fuel economy in mind, may frequently use the low accelerator operation amount region, and may possibly maintain for a long time an accelerator operation amount where the fuel economy is poor. When the driver adjusts the accelerator depression in response to turning on and off of the lamp, the driver may frequently increase and decrease the accelerator depression around the threshold for turning on and off the lamp, which may reduce fuel economy.

The display device described in JP-A-2002-370560 calculates the instantaneous fuel consumption for comparison with the fuel consumption based on a recommended driving pattern. However, it is not possible to provide appropriate accelerator operation instructions to the driver before the fuel economy is reduced. For example, in the throttle valve control of the gasoline car, the engine may be controlled based on the detection of changes in the accelerator depression speed. However, according to the display device described in JP-A-2002-370560, the driver may not learn the way to avoid reducing fuel economy in response to the accelerator depression because the causes that lead to be reduced fuel economy are not displayed to the driver. In addition, the display device described in JP-A-2002-370560 provides no indication of the accelerator depression amount until the threshold for displaying "appropriate" or "over-depressed" is reached, as similar to JP-A-2002-370560. Accordingly, the driver is not aware of how much further the accelerator pedal may be depressed.

SUMMARY OF THE INVENTION

The present invention provides a fuel economy improvement assist device and a method of improving fuel economy that displays information that may instruct the driver of the accelerator operation region that is suitable for improving fuel economy.

A first aspect of the present invention provides a fuel economy improvement assist device having accelerator operation amount detection means for detecting an accelerator operation amount, and display control means for displaying, on a display device, a target value corresponding to a target accelerator operation amount and a deviation value of the detected accelerator operation amount from the target accelerator operation amount. The display control means calculates an accelerator depression speed based on the detected accelerator operation amount, and variably displays the deviation value of the detected accelerator operation amount in accordance with the calculated accelerator depression speed.

Fuel consumption depends on the accelerator depression speed of the driver. Therefore, according to the present invention, it is possible to alert the driver of the effect that a particular accelerator depression speed will have on fuel consumption by changing the display value in accordance with the accelerator depression speed.

In the fuel economy improvement assist device in accordance with the above first aspect, if the accelerator depression speed from a first accelerator operation amount to a second accelerator operation amount beyond the first accelerator operation amount is equal to or above a predetermined value, the display control means may increase a change amount from a deviation value of the first accelerator operation amount with respect to the target accelerator operation amount to a deviation value of the second opening operation amount with respect to the target accelerator operation amount.

According to the present invention, the driver may be led into thinking that the accelerator operation amount would exceed or much further exceed the target accelerator operation amount by increasing the change amount when the accelerator depression speed is equal to or exceeds a predetermined value, and thereby the accelerator depression speed may be restricted.

In the fuel economy improvement assist device in accordance with the first aspect, when the accelerator depression speed from a first accelerator operation amount to a second accelerator operation amount beyond the first accelerator operation amount is equal to or above a predetermined value, the display control means may display a greater deviation value of an accelerator operation amount detected when or within a prescribed period after it has been determined that the accelerator depression speed is equal to or above the predetermined value, than the target value corresponding to the target accelerator operation amount.

According to the present invention, a greater value than the target value may be displayed, for example, even if the accelerator operation amount is smaller than the target accelerator operation amount. Therefore, the driver may be strongly alerted, and thereby fuel consumption may be further suppressed.

In the fuel economy improvement assist device in accordance with the above first aspect, the display control means may variably display the deviation value reflecting a torque transmission loss in a torque converter of a transmission.

In the fuel economy improvement assist device in accordance with the first aspect, if the accelerator depression speed causes lock-up release of the torque converter, the display control means may variably display the deviation value reflecting a torque transmission loss due to the lock-up release.

In the fuel economy improvement assist device in accordance with the first aspect, if the accelerator depression speed is below a first predetermined value, the display control means may display a first deviation value that corresponds to the detected accelerator operation amount; if the accelerator depression speed is between the first predetermined value and a second predetermined value, the display control means may display a second deviation value that corresponds to the detected accelerator operation amount reflecting the accelerator depression speed; and if the accelerator depression speed is equal to or above the second predetermined value, the display control means may display a third deviation value that corresponds to the detected accelerator operation amount reflecting the accelerator depression speed in a region where a fuel consumption increases abruptly.

According to the present invention, it is possible to correctly obtain the torque transmission loss due to the lock-up release, and thereby may cause to attract the attention of the driver.

A second aspect of the present invention provides a fuel economy improvement assist method to display, on a display device, a target value that corresponds to a target accelerator operation amount and a deviation value of an accelerator operation amount from the target accelerator operation amount, including: detecting the accelerator operation amount; calculating an accelerator depression speed based on the detected accelerator operation amount; and displaying the deviation value variably in accordance with the calculated accelerator depression speed.

The method of improving fuel economy in accordance with the above second aspect may further include: determining whether the accelerator depression speed is equal to or above a predetermined value; and increasing a change amount of the deviation value when it is determined that the accelerator depression speed is equal to or above the predetermined value.

BRIEF DESCRIPTION OF THE DRAWINGS

The foregoing and further features and advantages of the invention will become more apparent from the following description of an example embodiment with reference to the accompanying drawings, in which like numerals are used to represent like elements and wherein.

DETAILED DESCRIPTION OF EMBODIMENTS

An embodiment of the invention will be described below with reference to the drawings. A fuel economy improvement assist device 1 in accordance with the invention shown in FIG. 1 displays information that guides a driver to operation the accelerator within a low fuel consumption region where the engine and the drive system are maintained at high efficiency. The fuel economy improvement assist device 1 does not merely indicate in a binary manner whether the accelerator operation amount is improving or worsening the fuel consumption, but also displays the current accelerator operation amount relative to the target accelerator operation amount so that the driver may adjust the accelerator pedal depression amount to the target accelerator operation amount. If the accelerator pedal depression speed is fast enough to increase the fuel consumption, the fuel economy improvement assist device 1 increases the displayed value of the current accelerator operation amount compared to the case of such an accelerator pedal depression speed that does not reduce fuel economy, or in some cases displays the current accelerator operation amount as a value that exceeds the target accelerator operation amount, thereby encouraging the driver to reduce the accelerator pedal depression speed and operate the accelerator in a manner that does not reduce fuel economy.

Figure 1:
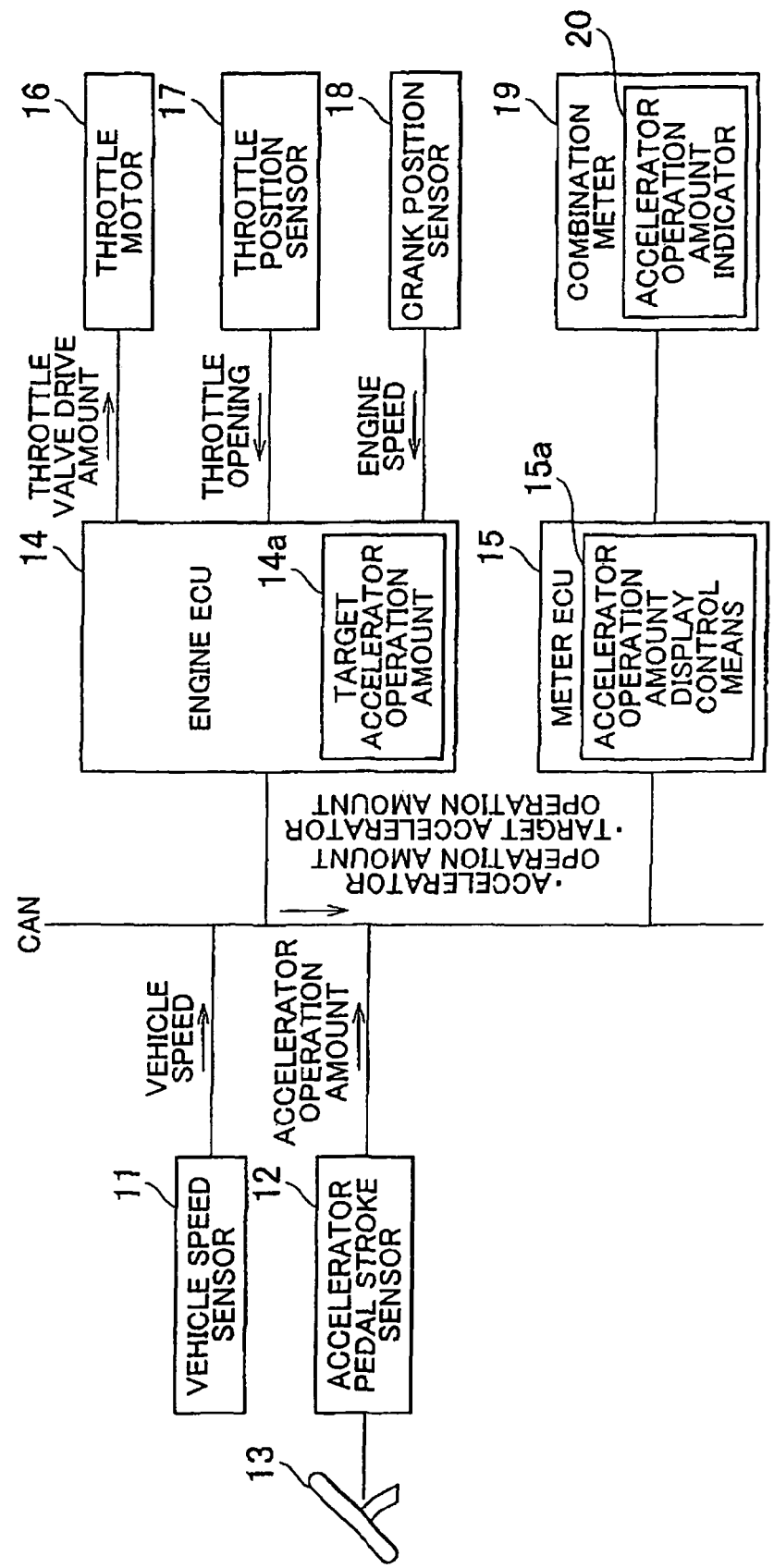
FIG. 1 is a functional block diagram of a low fuel consumption driving assist device in accordance with the present invention.

FIG. 1 is a functional block diagram of the fuel economy improvement assist device 1. The fuel economy improvement assist device 1 is made up of a vehicle speed sensor 11 that detects the driving state and the operating state, an accelerator pedal stroke sensor (hereinafter referred to as "ACC sensor") 12, an engine electronic control unit (ECU) 14 that controls the engine, and a meter electronic control unit (ECU) 15 that controls meters and lamps in a combination meter 19. The above components of the fuel economy improvement assist device 1 are connected to each other via in-vehicle LAN such as controller area network (CAN).

The meter ECU 15 and the engine ECU 14 are each a microcomputer made up of a CPU for executing a program, a RAM for serving as a work area for running a program or temporarily storing data, an electronically erasable and programmable read only memory (EEPROM) for holding data even when the ignition is turned off, an input and output interface for data input and output and interfacing with other ECUs, a communication controller for communication with other ECUs, a ROM for storing; a program, and so forth. The above components of the microcomputer are connected via a bus. The accelerator operation amount display control means 15a for controlling display on an accelerator operation amount indicator 20 may be implemented as a program that is executed by the CPU.

The vehicle speed sensor 11 detects as a pulse a change in the magnetic flux that occurs when projections provided on a rotor of each wheel at regular intervals pass, for example, to output the vehicle speed calculated from the number of pulses for each predetermined sampling period. The ACC sensor 12 detects the accelerator operation amount through changes in the intensity of the magnetic field that passes through a hall element in accordance with the operation amount of an accelerator pedal 13.

The engine ECU 14 is a control device for optimally executing engine control, which include basic engine control, fuel injection control to control fuel injection according to the accelerator operation amount, ignition timing control to energize an ignition plug at an optimally optimum timing, and so forth. To the engine ECU 14 are connected a crank position sensor 18 that detects the engine speed according to the crank position, a throttle position sensor 17 that detects the throttle opening, and a throttle motor 16 that drives a throttle valve to open and close. The engine ECU 14 executes the throttle opening control, rotational speed control during idling, and rotational speed control during constant-speed driving control such as when cruise control is used according to the accelerator operation amount, by outputting the throttle valve drive amount to the throttle motor 16 according to the accelerator operation amount and detecting the actual throttle opening with the throttle position sensor 17.

The meter ECU 15 acquires a signal from various sensors, switches, and other ECUs to give a warning about the vehicle state such as vehicle speed and engine speed, that a door is not properly shut, and so forth, by turning on a predetermined lamp in the meters in the combination meter 19.

In the fuel economy improvement assist device 1 in accordance with this embodiment, the combination meter 19 has an accelerator operation amount indicator 20 that displays the accelerator operation amount suitable for low fuel consumption driving, which is controlled by the accelerator operation amount display control means 15a as described later.

The accelerator operation amount display control means 15a receives the current accelerator operation amount and the target accelerator operation amount 14a from the engine ECU 14, and displays the current accelerator operation amount after conversion for display on the accelerator operation amount indicator 20. The target accelerator operation amount 14a, which is described later, is stored in advance in the EEPROM of the engine ECU 14 or determined appropriately according to the vehicle state or the vehicle speed by the engine ECU 14.

Figure 2:
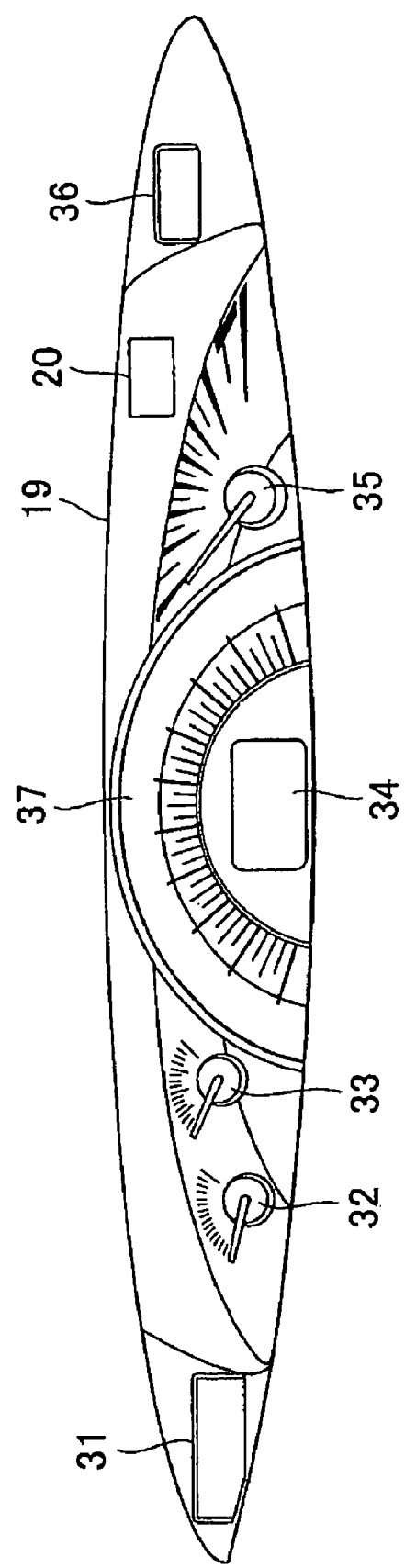
FIG. 2 shows an example of various indicators that may be provided in an instrument panel in accordance with the present invention.

FIG. 2 shows an example of the combination meter 19 provided in an instrument panel. The combination meter 19 has, for example, a coolant temperature meter 32 for indicating the temperature of engine cooling water with a needle driven by a stepper motor, a fuel level meter 33 for displaying the fuel level detected by a fuel gauge, a speedometer 37 for displaying the vehicle speed, a tachometer 35 for displaying the engine speed, and so forth. An odo/trip meter 31 is a liquid crystal display device that can serve as both an odometer and a tripmeter in a switchable manner, and that can also display the current shift position (N, D, P, or R). A clock 36 displays the current time.

A multi-information display (hereinafter referred to as "NMID") 34 provided in the center may be a liquid crystal dot matrix display, and displays various information in a digital amount using numerals, characters, or the like, or in an analog amount by the size of a symbol or a mark, or the like. For example, the MID 34 displays the instantaneous fuel consumption, the accumulated average fuel consumption, the remaining travel distance calculated based on the accumulated average fuel consumption and the fuel level, the accumulated average vehicle speed, and where necessary, a message to assist the driver.

The accelerator opening indicator 20 is described. The accelerator operation amount indicator 20 is provided in the right part of the combination meter 19 in FIG. 2, and displays the target accelerator operation amount 14a suitable for low fuel consumption driving and the current accelerator operation amount without calculating the instantaneous fuel consumption. The accelerator operation amount indicator 20 may be displayed on the MID 34 or a car navigation screen, or projected on the windshield by a head-up display (HUD) device.

Figure 3A:
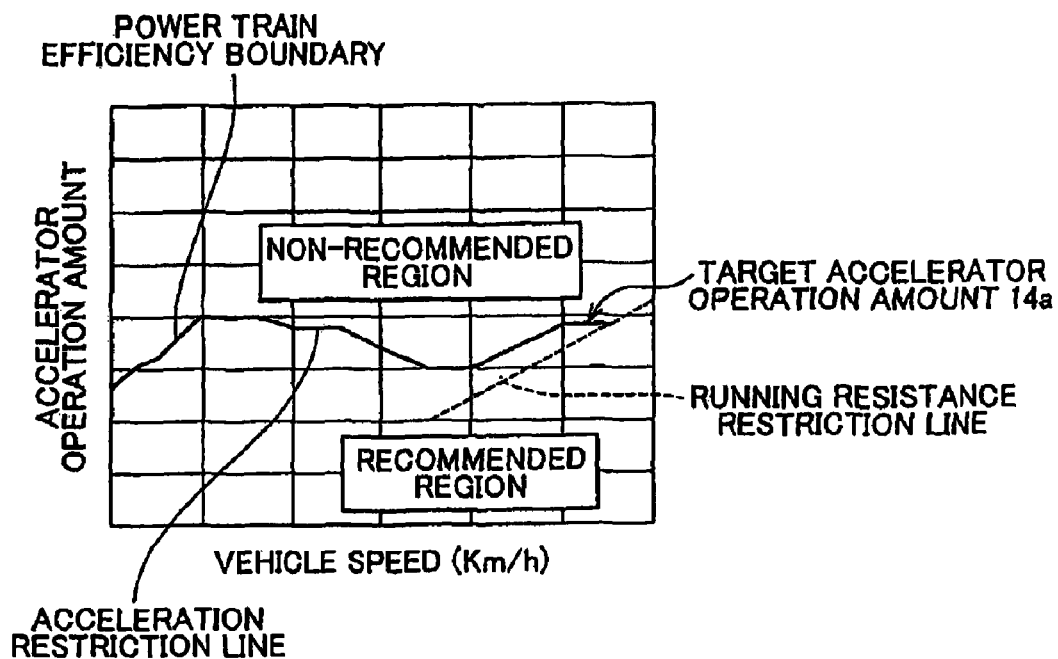
FIGS. 3A and 3B are charts that explain a recommended region and a non-recommended region of an accelerator operation amount in accordance with the present invention.

FIG. 3A shows an example of the relationship between the vehicle speed and the target accelerator operation amount 14a. In FIG. 3A, the side where the accelerator operation amount is larger than the target accelerator operation amount 14a is a non-recommended region where the fuel economy is decreased, while the side where the accelerator operation amount is smaller is a recommended region. The accelerator operation amount indicator 20 is a display device to guide an accelerator opening by the driver to the recommended region.

The target accelerator operation amount 14a is determined as follows. First, because the transmission efficiency in the power train system (clutch, transmission, propeller shaft, differential gear, and drive shaft) of the vehicle changes according to the vehicle speed, an accelerator operation amount that maintains the vehicle driving reducing fuel economy is determined as a threshold (power train efficiency boundary).

Then, assuming changes in the running environment on the road and in the efficiency in the power train system, driving with a predetermined acceleration or more abruptly reduces fuel economy, and driving with such an acceleration is rarely required. Therefore, an acceleration restriction line for restricting the accelerator operation amount according to the acceleration is provided.

Further, fuel consumption increases in the high-speed range due to running resistance (e.g., air resistance). Therefore, a maximum accelerator operation amount that corresponds to the running resistance is set, and a running resistance restriction line is provided so that the acceleration is restricted from exceeding the maximum accelerator operation amount in the high-speed range.

The target accelerator operation amount 14a is defined by the powertrain efficiency boundary, the acceleration restriction line, and the running resistance restriction line described above, and an accelerator operation amount below the target accelerator operation amount 14a is recommended during driving.

Figure 3B:
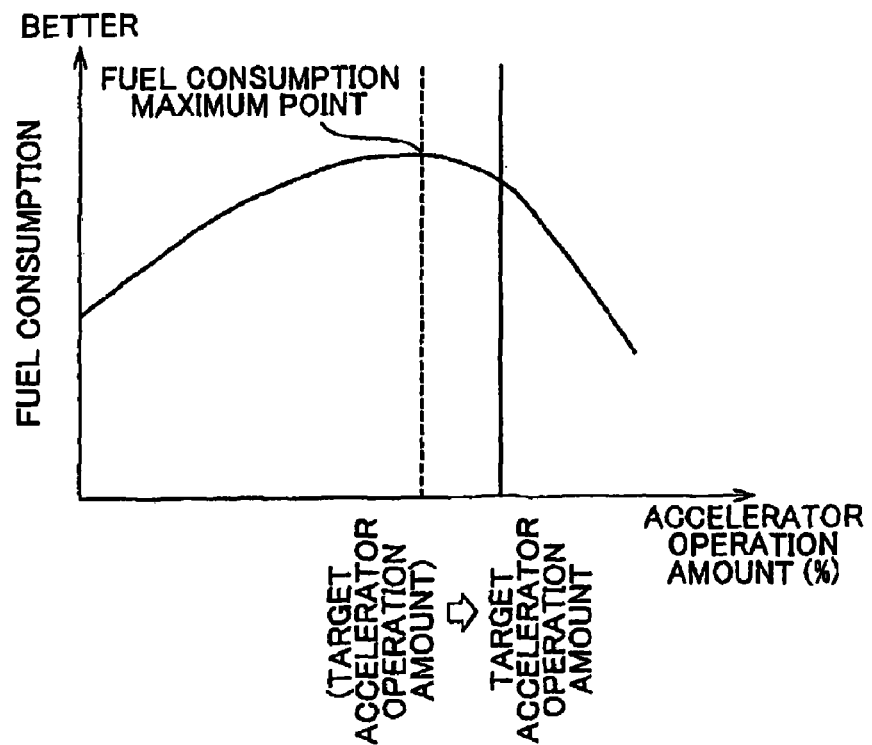

In general, as shown in FIG. 3B, the fuel consumption tends to increase because the engine speed is low in the region if accelerator operation amount is smaller than the fuel consumption maximum point. However, in the region where the accelerator operation amount is larger, the fuel consumption tends to increase because of increased engine speed, extra fuel injection, and so forth.

Thus, the accelerator operation amount between the two regions where the fuel consumption is maximized corresponds to the fuel consumption maximum point optimum for low fuel consumption driving illustrated in FIG. 3A. Because it is comfortable to drive around the region of the accelerator operation amount where the fuel consumption is maximum, guiding an operation by the driver to a point before the fuel consumption maximum point results in reduced drivability, and therefore such a point is not suitable as an indicator for allowing the driver to drive comfortably. In view of the above, in this embodiment, the target accelerator operation amount 14a is set to an accelerator operation amount that slightly exceeds the fuel consumption maximum point to guide an operation by the driver to an accelerator operation amount not more than the target accelerator operation amount 14a. In this way, a target accelerator operation amount at which many drivers can drive comfortably is displayed.

The differential between the target accelerator operation amount 14a determined as an accelerator operation amount to be achieved and the current accelerator operation amount, which are displayed along with each other, is an accelerator operation amount to be changed by the driver.

Figure 4A:
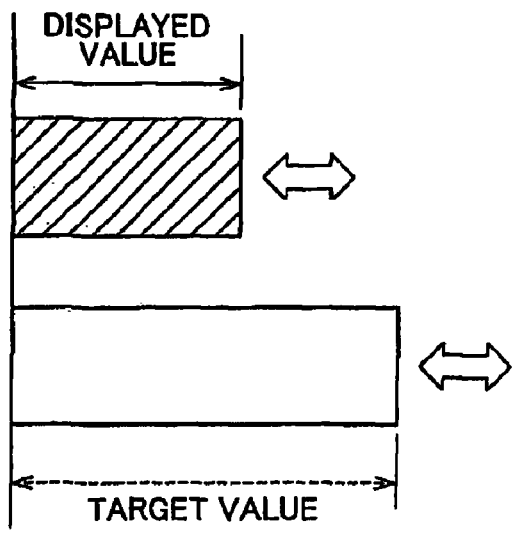
FIGS. 4A, 4B, and 4C each show an example of an accelerator operation amount indicator which displays a display value and a target value each in an analog amount in accordance with the present invention.

FIG. 4A shows a display example of the current accelerator operation amount and the target accelerator operation amount 14a each displayed in an analog amount. Hereinafter, the accelerator operation amount displayed in the accelerator operation amount indicator 20 may be referred to as the "displayed value," and the target accelerator operation amount 14a indicated in the accelerator operation amount indicator 20 may be referred to as the "target value."

The display such as that shown in FIG. 4A, however, is not suitable as information to be displayed to the driver. That is, the target value changes any time because the vehicle speed changes any time, while the displayed value, which is an accelerator operation amount by the driver, also changes any time. This causes the displayed value and the target value to change independently of each other, and therefore the differential from the target value changes irregularly when the displayed value increases and the target value decreases (or vice versa), for example, making it difficult for the driver to adjust the accelerator operation amount according to the target value.

Figure 4B:
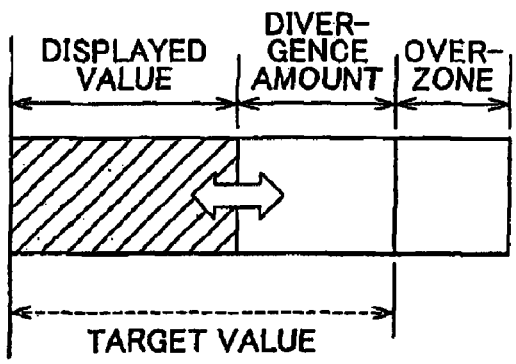

In view of the above, in this embodiment, the accelerator operation amount display control means 15a integrates the displayed value and the target value into single display information to be shown to the driver. FIG. 4B shows an example of the single display information to be displayed on the accelerator operation amount indicator 20. In the single display information of FIG. 4B, the target value is displayed at a fixed position, and the displayed value is displayed in its proportion to the target value (the value obtained by dividing the displayed value by the target value).

In such display, the displayed value changes in length relative to the target value, which is fixed, according to an accelerator operation amount, allowing the driver to make an accelerator operation using the displayed value or the difference between the target value and the displayed value (hereinafter referred to as "divergence amount") as an indicator. The region on the right side of the target value corresponds to an "overzone" where the fuel consumption increases abruptly, and the right end of the overzone corresponds to the maximum accelerator operation amount, for example.

Figure 4C:
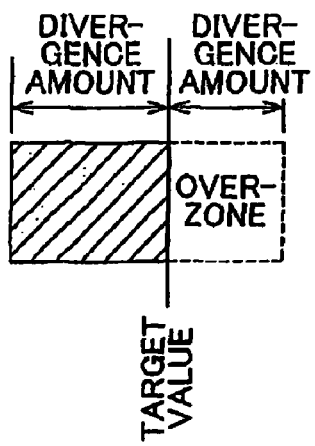

Single display information may be obtained by displaying the target value at a fixed position and displaying a divergence amount with reference to the target value, as shown for example in FIG. 4C. In FIG. 4C, the length of the divergence amount on the left side of the target value indicates that there is allowance before the accelerator operation reaches the target value, while the length of the divergence amount on the right side indicates that the accelerator operation is excessive.

The driver may adjust the accelerator operation amount so that the deviation amount becomes zero by viewing the accelerator operation amount indicator 20 such as shown in FIG. 4B or 4C. The displayed value is obtained by averaging the accelerator operation amount output from the ACC sensor 12 at predetermined intervals to prevent excessive variations. The accelerator operation amount indicator 20 is displayed in color with respective elements in the display region colored differently.

Figure 5A:
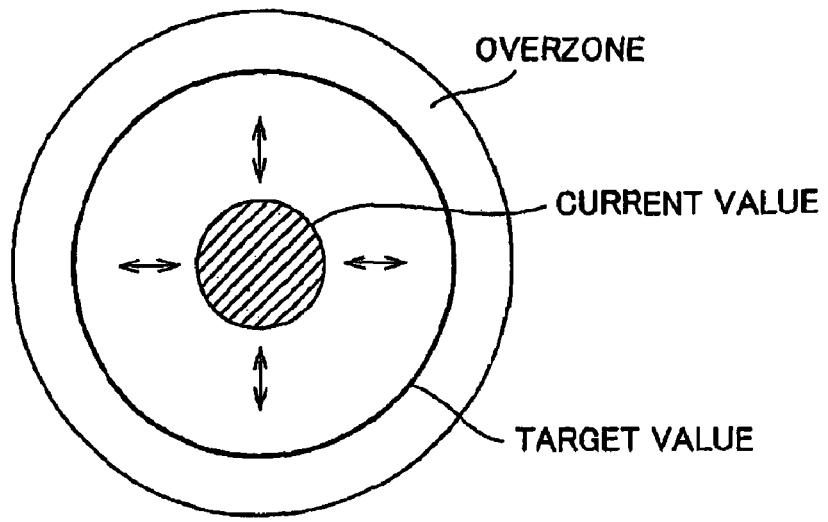
FIGS. 5A, 5B, 5C, and 5D each show an example of the accelerator operation amount indicator which displays a change amount in the accelerator operation amount and a change amount in the display value correlated non-linearly in accordance with the present invention.

The accelerator operation amount indicator 20 may take various forms other than those in a bar shape shown in FIG. 4A, 4B, or 4C. FIGS. 5A to 5D show modifications of the accelerator operation amount indicator 20. The accelerator operation amount indicator 20 is only required to display the displayed value relative to the target value, which is fixed. FIG. 5A shows an example of the accelerator operation amount indicator 20 in a circular shape. In the circular accelerator operation amount indicator 20, the target value and the overzone are displayed as circles concentric with each other and having a fixed diameter, while the displayed value is displayed as a circle around the same center and having a variable diameter. The accelerator operation amount indicator 20 is not limited to a circular representation, but may be in other shapes (for example, a polygon such as a triangle and a quadrangle).

Figure 5B:

FIG. 5B shows an example of the accelerator operation amount indicator 20 in an indicator needle representation. When the accelerator operation amount indicator 20 is depicted using an indicator needle, the displayed value is indicated by the position of the needle relative to the target value, which is fixed.

Figure 5C:
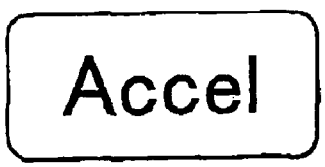

FIG. 5C shows an example of the accelerator operation amount indicator 20 that indicates the accelerator operation amount by changes in color. In FIG. 5C, a mark or a symbol representing the accelerator operation amount ("Accel" in the drawing) changes in color according to the displayed value. For example, the color of the entire mark gradually changes in the order of "green, yellow, and red" as the accelerator operation amount approaches the target value. If the target value is correlated with the red color, for example, the mark turns red when the accelerator operation amount reaches the target value. After that, the entire mark may be caused to flash on and off to allow the driver to recognize that the target value has been reached. A notification sound may be generated when the target value is reached. In order to improve the viewability, it is preferable to combine the accelerator operation amount indicator 20 in a circular shape or in an indicator needle representation with color changes.

Figure 5D:
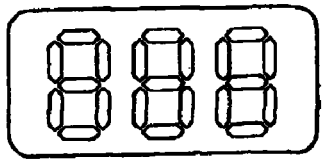

FIG. 5D shows an example of the accelerator operation amount indicator 20 that indicates the accelerator operation amount using numerals. The accelerator operation amount display control means 15a displays the displayed value of the accelerator operation amount using numerals with the target value defined as 100. By digitally displaying the accelerator operation amount indicator 20, the driver can understand the numerical displayed value. In addition, the color may be changed according to the numerals.

1. Example 1

Figure 6:
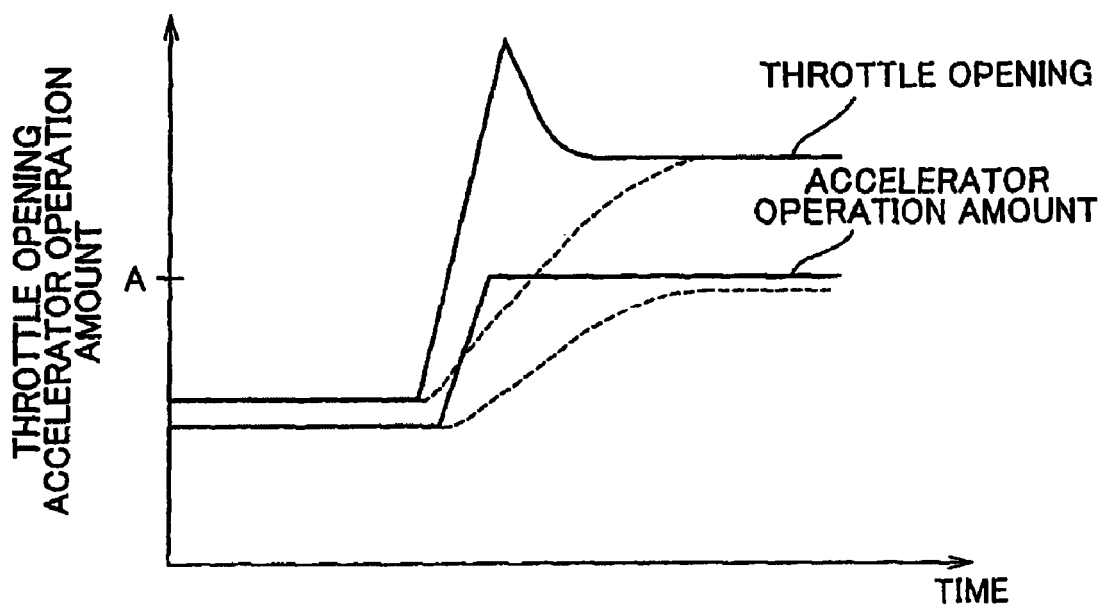
FIG. 6 shows an example of an accelerator operation that increases the fuel consumption.

Display with Throttle Control in Accordance with Accelerator Pedal 13 Depression Speed Reflected While the engine. ECU 14 preferentially executes engine control that maximizes the efficiency, the engine ECU 14 occasionally executes an engine control that increases the fuel consumption in order to secure the acceleration response and the moving performance in response to an operation of the accelerator pedal 13. FIG. 6 shows an example of an accelerator operation that increases fuel consumption. In FIG. 6, the solid lines indicate the accelerator operation amount and the throttle opening when the accelerator pedal 13 depression speed is above a predetermined value, while the dashed lines indicate those in the case where the accelerator pedal 13 depression speed is below the predetermined value.

For example, in the throttle control of gasoline cars, the engine ECU 14 detects the driver's intention to accelerate or climb up based on the accelerator pedal 13 depression speed, and may abruptly open the throttle. As shown in FIG. 6, when the accelerator pedal depression speed is faster, the engine ECU 14 opens the throttle abruptly in an overshooting manner. In this case, the throttle opening is larger than that in the case where the accelerator pedal 13 is depressed slowly, even if the accelerator operation amount A of after the depression is the same. While the acceleration in response to an operation of the accelerator pedal 13 may be improved by opening the throttle abruptly as described above, it sacrifices the efficiency and therefore reduces the fuel economy.

In view of the above, in Example 1, the driver is guided to avoid depressing the accelerator pedal 13 excessively fast by having the accelerator pedal 13 depression speed reflected in the displayed value on the accelerator operation amount indicator 20. For example, if the accelerator pedal 13 depression speed is equal to or above a predetermined value, the accelerator operation amount display control means 15*a* increases the displayed value corresponding to the accelerator operation amount of after the depression to a value larger than that shown when the accelerator pedal 13 depression speed is below the predetermined value. In other words, if the accelerator pedal 13 depression speed is equal to or above the predetermined value, the displayed value is increased from a value corresponding to the accelerator pedal 13 depression amount to be closer to the overzone.

Thus, because the displayed value on the accelerator operation amount indicator 20 changes so fast that the displayed value quickly approaches or exceeds the target value when the accelerator pedal 13 depression speed is fast, the driver is expected to restrict the accelerator pedal 13 depression speed.

In order to determine the displayed value, the accelerator operation amount display control means 15*a* utilizes, for example, the following equation:

$$\text{Displayed value} = x + k(da/dt - f_0) \quad (1)$$

where, x: displayed value corresponding to accelerator operation amount;
a: accelerator operation amount;
k: display conversion coefficient; and
$f_0$: accelerator pedal depression speed that results in increased fuel consumption.

According to the equation (1), a value obtained by multiplying the value in the parenthesis by k is added to the displayed value x, which corresponds to the accelerator operation amount. Because the value in the parenthesis becomes positive when the accelerator pedal 13 depression speed da/dt exceeds $f_0$, the displayed value becomes larger than the displayed value x, which corresponds to the accelerator operation amount. If the accelerator pedal 13 depression speed does not result in an increase in the fuel consumption, da/dt is smaller than $f_0$ and therefore the value in the parenthesis is negative. In this case, the value in the parenthesis is regarded as zero, so that the displayed value x corresponding to the accelerator operation amount is used as it is as the displayed value.

Figure 7:
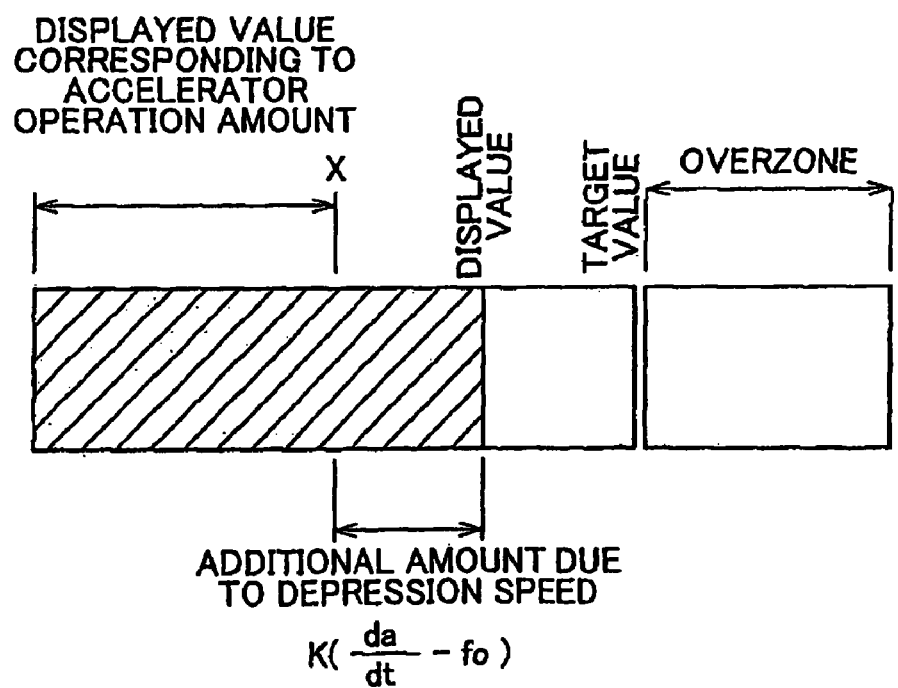
FIG. 7 shows an example of the display value displayed on the accelerator operation amount indicator in accordance with the present invention.

FIG. 7 shows an example of the displayed value that is displayed on the accelerator operation amount indicator 20. In FIG. 7, the displayed value is larger than the displayed value x corresponding to the accelerator operation amount A by an additional amount $k(da/dt - f_0)$ due to the accelerator pedal depression speed. Because the displayed value is updated at predetermined intervals, the displayed value is increased (an end of the displayed value moves to the right) rapidly while the additional amount $k(da/dt - f_0)$ due to the accelerator pedal depression speed is positive.

As described above, if the accelerator pedal 13 depression speed is fast enough to cause the fuel consumption to increase, it is possible to visually indicate to the driver that the fuel consumption will increase and the amount by which the fuel consumption will increase. If the accelerator pedal 13 depression speed is fast enough to cause the fuel consumption to increase, the displayed value changes greatly to rapidly approach or enter the overzone where the fuel consumption increases. Consequently, it is possible to allow the driver to restrict the accelerator pedal 13 depression speed, and to be guided to operation the accelerator as to avoid deterioration in the fuel economy.

The additional amount due to the accelerator pedal depression speed allows the displayed value for even an accelerator operation amount smaller than the target accelerator operation amount 14*a* to be displayed in the overzone, strongly attracting the attention of the driver and minimizing increase in fuel consumption.

The equation (1) for determining the displayed value according to the accelerator pedal 13 depression speed is merely an example. Alternatively, da/dt may be replaced with the accelerator pedal 13 depression acceleration $da/dt^2$, and the display conversion coefficient k may be replaced with a function of the accelerator pedal 13 depression speed da/dt, for example.

Figure 8:
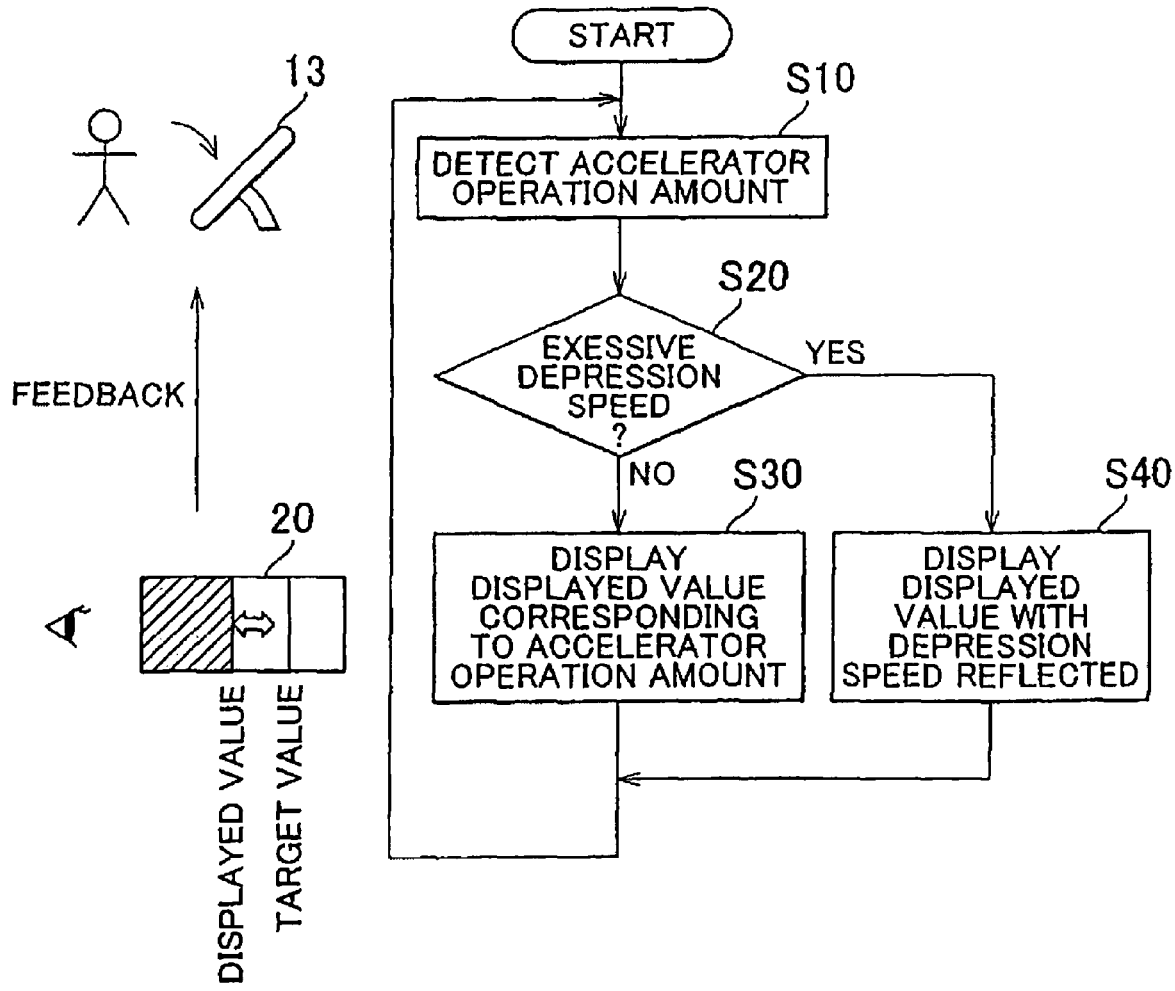
FIG. 8 is a flowchart of the procedure for the fuel economy improvement assist device in accordance with the present invention to display the display value on the accelerator operation amount indicator.

FIG. 8 is a flowchart of the procedure for the fuel economy improvement assist device 1 to display the displayed value on the accelerator operation amount indicator 20. The procedure in the flowchart of FIG. 8 may be started when the ignition is turned on, for example.

When the driver operates the accelerator pedal 13, the ACC sensor 12 detects the accelerator operation amount (S10). The detected accelerator operation amount is sent to the engine ECU 14 at predetermined intervals. The engine ECU 14 sets the target accelerator operation amount 14*a* according to the accelerator operation amount and the vehicle speed, and sends the accelerator operation amount and the target accelerator operation amount 14*a* to the meter ECU 15.

The accelerator operation amount display control means 15*a* determines whether the driver has depressed the accelerator pedal 13 at an excessive depression speed (S20). The accelerator operation amount display control means 15*a* detects an excessive depression speed if, for example, the accelerator pedal depression speed da/dt calculated based on N accelerator operation amount stored after acquisition at each cycle time exceeds $f_0$.

If an excessive depression speed is not detected NO in S20), the accelerator operation amount display control means 15a displays a displayed value that corresponds to the accelerator operation amount on the accelerator operation amount indicator 20 (S30).

If an excessive depression speed is detected (YES in S20), the accelerator operation amount display control means 15a calculates a displayed value using equation (1), and displays the calculated displayed value on the accelerator operation amount indicator 20 (S40).

The driver may adjust the accelerator pedal depression speed by viewing the accelerator operation amount indicator 20 displayed by the fuel economy improvement assist device 1 (feedback). Thus, the fuel economy improvement assist device 1 allows the driver to restrict the accelerator pedal 13 depression speed, and to be guided to an accelerator operation in the recommended region.

2. Example 2

Displayed Value with Reduction in Efficiency Accompanied by Accelerator Depression Reflected Automatic transmissions are designed to remain in the lock-up state whenever possible in order to improve efficiency. When the accelerator pedal 13 is suddenly depressed to increase the throttle opening, however, the lock-up clutch of the torque converter is released to obtain a high torque, which reduces the transmission efficiency of the engine.

Figure 9:
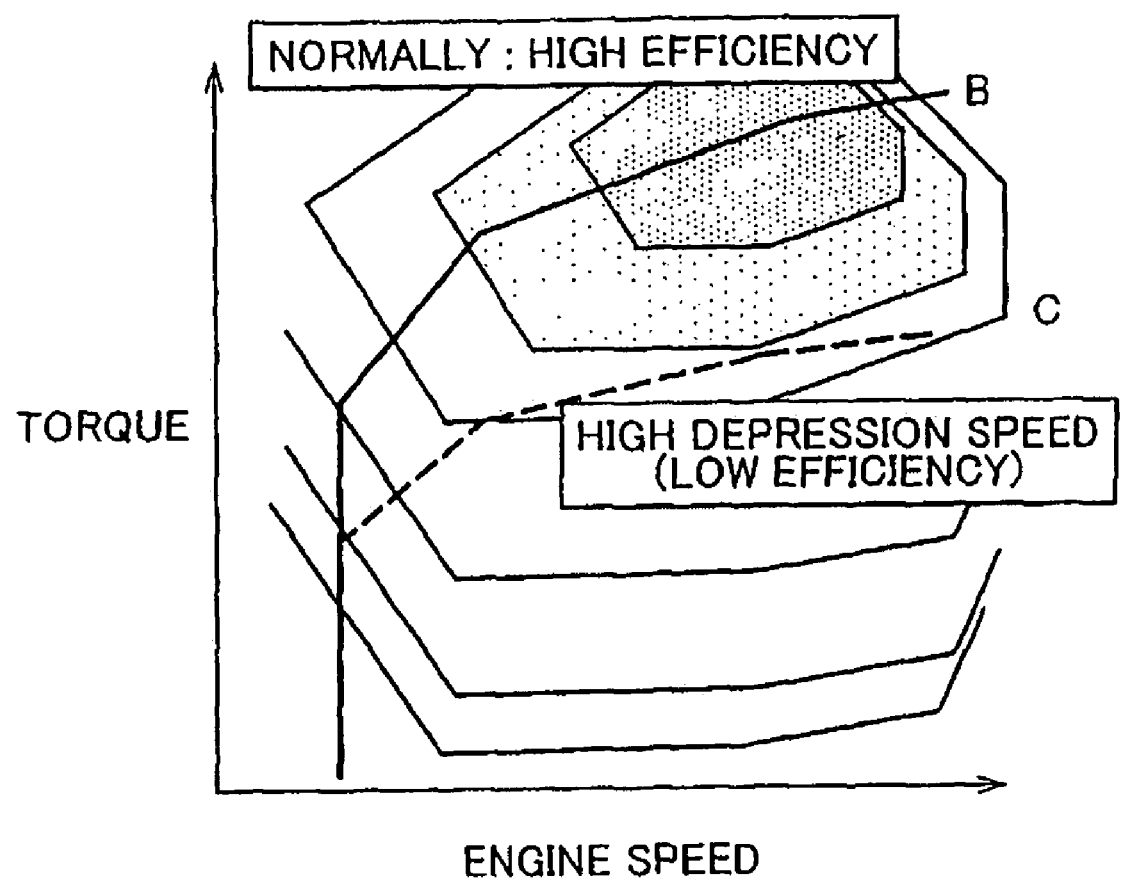
FIG. 9 is a diagram for explaining the engine efficiency defined by the relationship between the engine speed and the torque in accordance with the present invention.

FIG. 9 is a diagram for explaining the engine efficiency defined by the relationship between the engine speed and the torque. At approximately the same engine speed, for example, the efficiency is better as a higher torque is transmitted to the road surface. Thus, it is preferable to operate the accelerator pedal 13 so that the torque converter remains locked up as long as possible. If the accelerator pedal 13 depression speed is not so fast, the relationship between the engine speed and the torque changes as indicated by the line B. The line B corresponds to an accelerator operation that achieves an early shift to an efficient state with the torque converter locked up when the accelerator operation amount and the vehicle speed satisfy predetermined conditions. In contrast, if the accelerator pedal 13 depression speed is fast, the relationship between the engine speed and the torque changes as indicated by the line C. In this case, the fuel consumption is not controlled to be optimum with the lock-up clutch of the torque converter remains released because of the abrupt increase in the engine speed (increase of the throttle operation amount).

Figure 10:
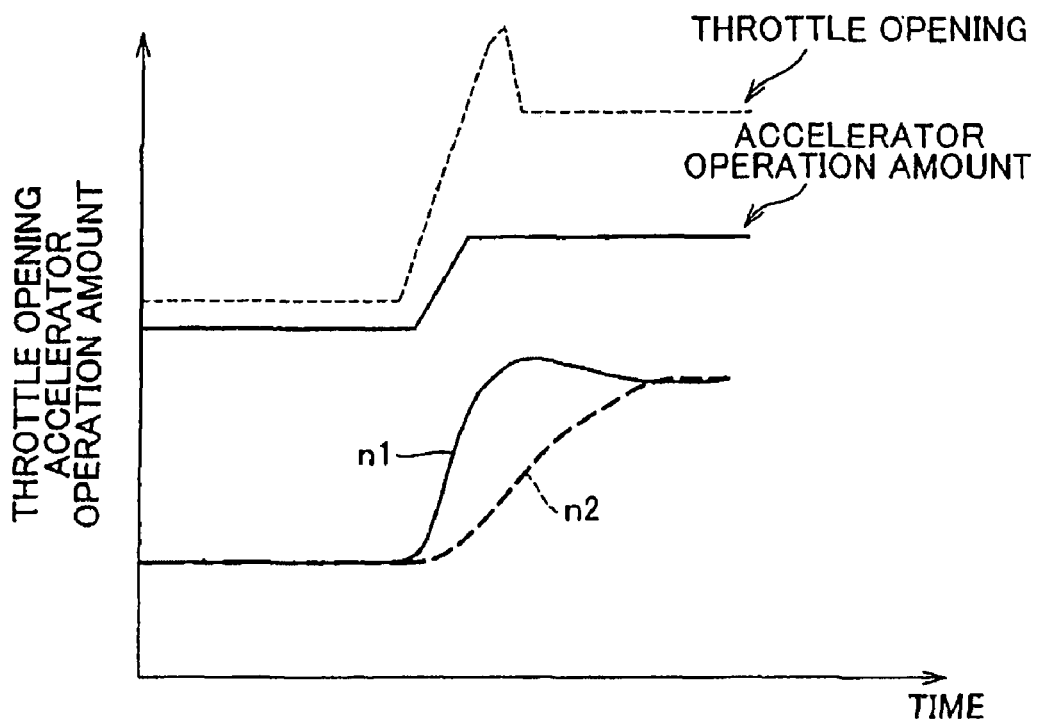
FIG. 10 is a chart showing the concept of reduction in the efficiency due to a lock-up delay.

Depressing the accelerator pedal 13 fast so that the lock-up clutch of the torque converter is released means that some of the drive force of the engine is not transmitted to the road surface but converted into friction force for a predetermined period. FIG. 10 is a chart showing the concept of reduction in the efficiency due to a lock-up delay. Here, n1 and n2 represent the rotational speed of an input shaft and an output shaft, respectively, of the torque converter. If the accelerator pedal 13 depression speed is fast, n1 is higher than n2 to obtain a high torque. Because the lock-up clutch of the torque converter does not engage until there is no difference between n1 and n2, the fuel consumption increases as the area surrounded by n1 and n2 increases.

In view of the above, in this example, the driver is guided to restrict the accelerator pedal 13 depression speed to prevent lock-up clutch of the torque converter is released by having an accelerator depression speed coefficient α, described below, reflected in the displayed value on the accelerator operation amount indicator 20. For example, if the accelerator pedal 13 depression speed is equal to or above a predetermined value, the accelerator operation amount display control means 15a increases the displayed value that corresponds to the final accelerator operation amount to be larger than that if the accelerator pedal 13 depression speed is below the predetermined value. In other words, if the accelerator pedal 13 depression speed is equal to or above the predetermined value, the displayed value is increased from a value that corresponds to the actual displacement of the accelerator pedal 13 to be closer to the overzone.

Thus, because the displayed value on the accelerator operation amount indicator 20 changes so fast that the displayed value approaches or exceeds the target value fast when the accelerator pedal 13 depression speed is fast, it is expected that a driver will reduce the accelerator pedal 13 depression speed.

In order to determine the displayed value, the accelerator operation amount display control means 15a utilizes, for example, the following equation:

$$\text{Displayed value} = \{\alpha + \eta(1+r)\} \cdot x \tag{2}$$

where, α: accelerator depression speed coefficient $k(da/dt - f_0)$;
x: displayed value corresponding to accelerator operation amount
a: accelerator operation amount
k: display conversion coefficient;
$f_0$: accelerator pedal depression speed that results in lock-up clutch of the torque converter is released;
r: ratio of difference between rotational speeds $(n1-n2)/n1$; and
η: conversion coefficient for converting r into fuel consumption.

The accelerator depression speed coefficient α allows the accelerator pedal depression speed to be reflected in the displayed value. Because the ratio r of the difference between the rotational speeds is proportional to the toque transmission loss in the torque converter, r allows the difference between the rotational speeds to be reflected in the displayed value. As in Example 1, the value in the parenthesis is regarded as zero in the case where da/dt is less than $f_0$.

Figure 11:
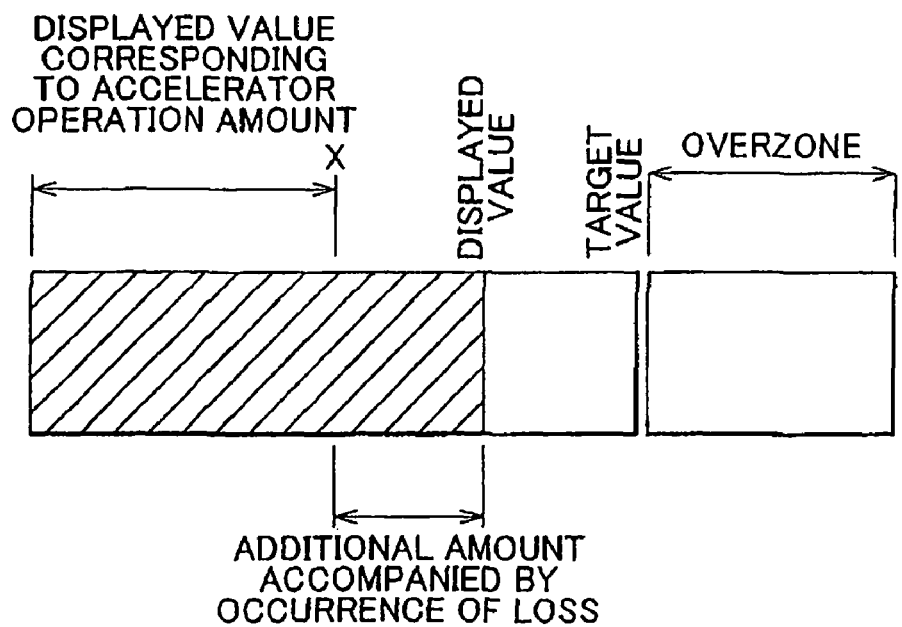
FIG. 11 shows an example of the display value displayed on the accelerator operation amount indicator in accordance with the present invention.

FIG. 11 shows an example of the displayed value on the accelerator operation amount indicator 20. In FIG. 11, the displayed value is larger than the displayed value x corresponding to the accelerator operation amount A by an additional amount due to the occurrence of a loss. The accelerator pedal depression speed and the difference between the rotational speeds due to lock-up clutch of the torque converter is released are reflected in the additional amount due to the occurrence of the loss.

As described above, it is possible, when the accelerator pedal 13 depression speed is fast so as to reduce the efficiency in the engine and the torque converter, to visually indicate to the driver the displayed value increased in accordance with to the amount of reduction in the efficiency. Thus, it is possible to allow the driver to restrict the accelerator pedal 13 depression speed, and to be guided to the accelerator operation as to avoid increasing the fuel consumption.

The additional amount due to the occurrence of a loss allows the displayed value for even an accelerator operation amount below the target accelerator operation amount 14a to be displayed in the overzone, strongly attracting the attention of the driver and thereby minimizing increases in fuel consumption.

The equation (2) for determining the displayed value according to the accelerator pedal 13 depression speed is merely an example. Other equations may alternatively be used, such as "$\{\alpha + \eta \cdot (1+r)\} + x$" or "$\{\alpha + \eta \cdot (n1/n2)\} \cdot x$."

Figure 12:
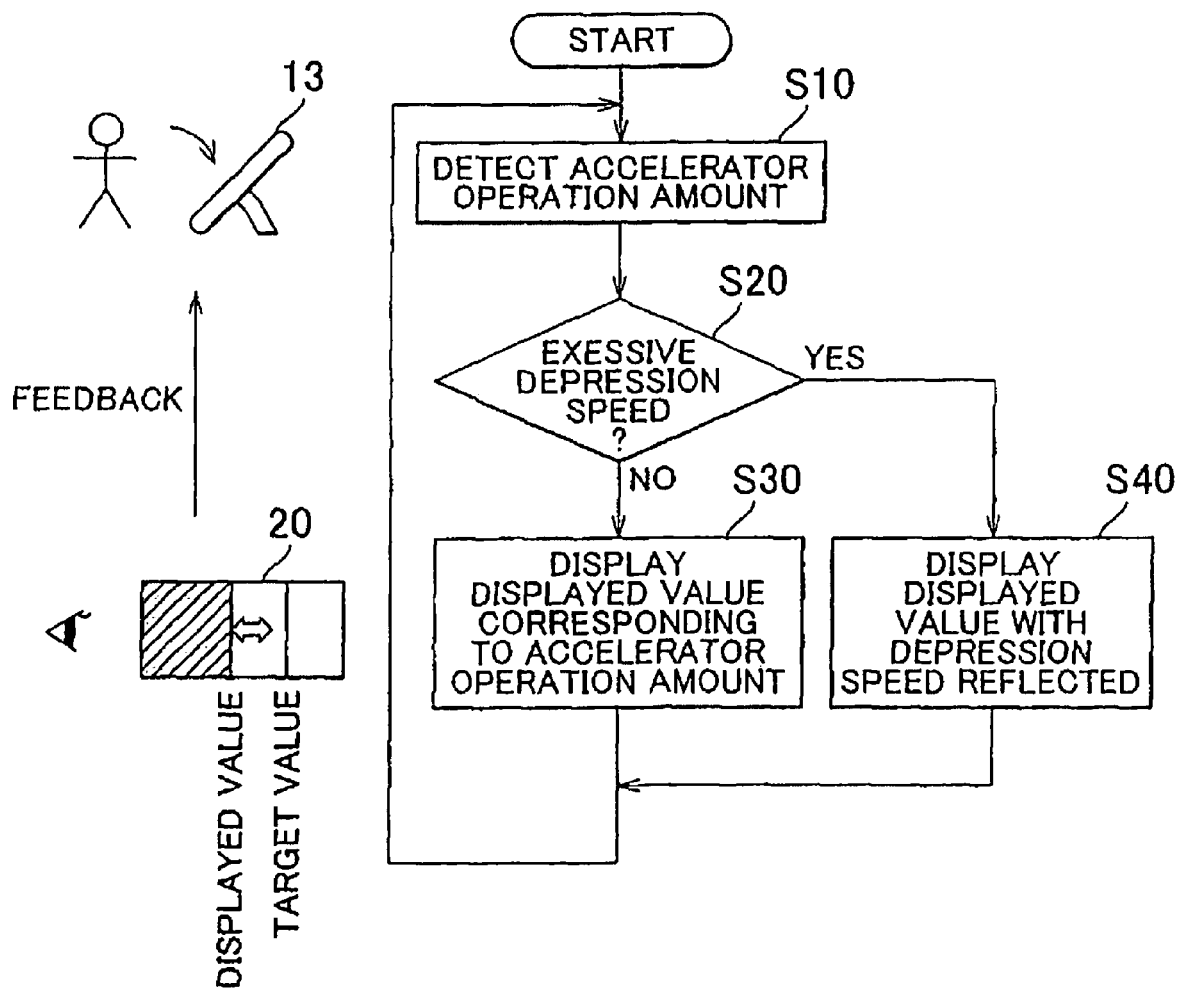
FIG. 12 is a flowchart of the procedure for the fuel economy improvement assist device in accordance with the present invention to display the display value on the accelerator operation amount indicator.

FIG. 12 is a flowchart of the procedure for the fuel economy improvement assist device 1 to display the displayed value on the accelerator operation amount indicator 20. In FIG. 12, the same steps as those in FIG. 8 are given the same numbers.

When the driver operates the accelerator pedal 13, the ACC sensor 12 detects the accelerator operation amount (S10). The detected accelerator operation amount is sent to the engine ECU 14 at predetermined intervals. The engine ECU 14 sets the target accelerator operation amount 14a according to the accelerator operation amount and the vehicle speed, and sends the accelerator operation amount and the target accelerator operation amount 14a to the meter ECU 15.

The accelerator operation amount display control means 15a determines whether the driver has depressed the accelerator pedal 13 at an excessive accelerator pedal depression speed (S20). Thus, when the accelerator pedal 13 depression speed da/dt is equal to or exceeds $f_0$, or where lock-up is released the accelerator operation amount display control means 15a detects an excessive depression speed the accelerator pedal 13 depression speed.

If an excessive depression speed is not detected (NO in S20), the accelerator operation amount display control means 15a displays a displayed value corresponding to the accelerator operation amount on the accelerator operation amount indicator 20 (S30).

If an excessive depression speed is detected (YES in S20), the accelerator operation amount display control means 15a calculates a displayed value using equation (2), and displays the calculated displayed value on the accelerator operation amount indicator 20 S40).

The driver may adjust accelerator pedal depression speed in view of the accelerator operation amount indicator 20 displayed by the fuel economy improvement assist device 1 (feedback). Thus, the fuel economy improvement assist device 1 allows the driver to restrict the accelerator pedal 13 depression speed, and to be guided to an accelerator operation in the recommended region.

3. Example 3

Display Utilizing Overzone According to Accelerator Pedal 13 Depression Speed The driver recognizes the overzone of the accelerator operation amount indicator 20 as a region where the fuel consumption increases abruptly. Therefore, the driver is expected to more effectively restrict the accelerator pedal 13 depression speed by more actively moving the displayed value to the overzone if the accelerator pedal depression speed is equal to or exceeds a predetermined value. Actively utilizing the overzone means increasing the displayed value to exceed the target value even if the accelerator operation amount is smaller than the target accelerator operation amount 14a, for example. The driver can recognize that the fuel consumption will increase when the accelerator pedal depression speed is too high because the displayed value is in the overzone even if the accelerator operation amount is not so large.

In order to display the displayed value for an accelerator operation amount that is below the target accelerator operation amount 14a in the overzone as if though the accelerator operation amount exceeded the target value, "divergence amount+α" is added to the displayed value immediately before the accelerator pedal depression speed reaches at least the predetermined value, for example. Alternatively, the displayed value may be displayed using a preset value in the overzone as a reference position when the accelerator pedal depression speed reaches at least the predetermined value.

Figure 13:
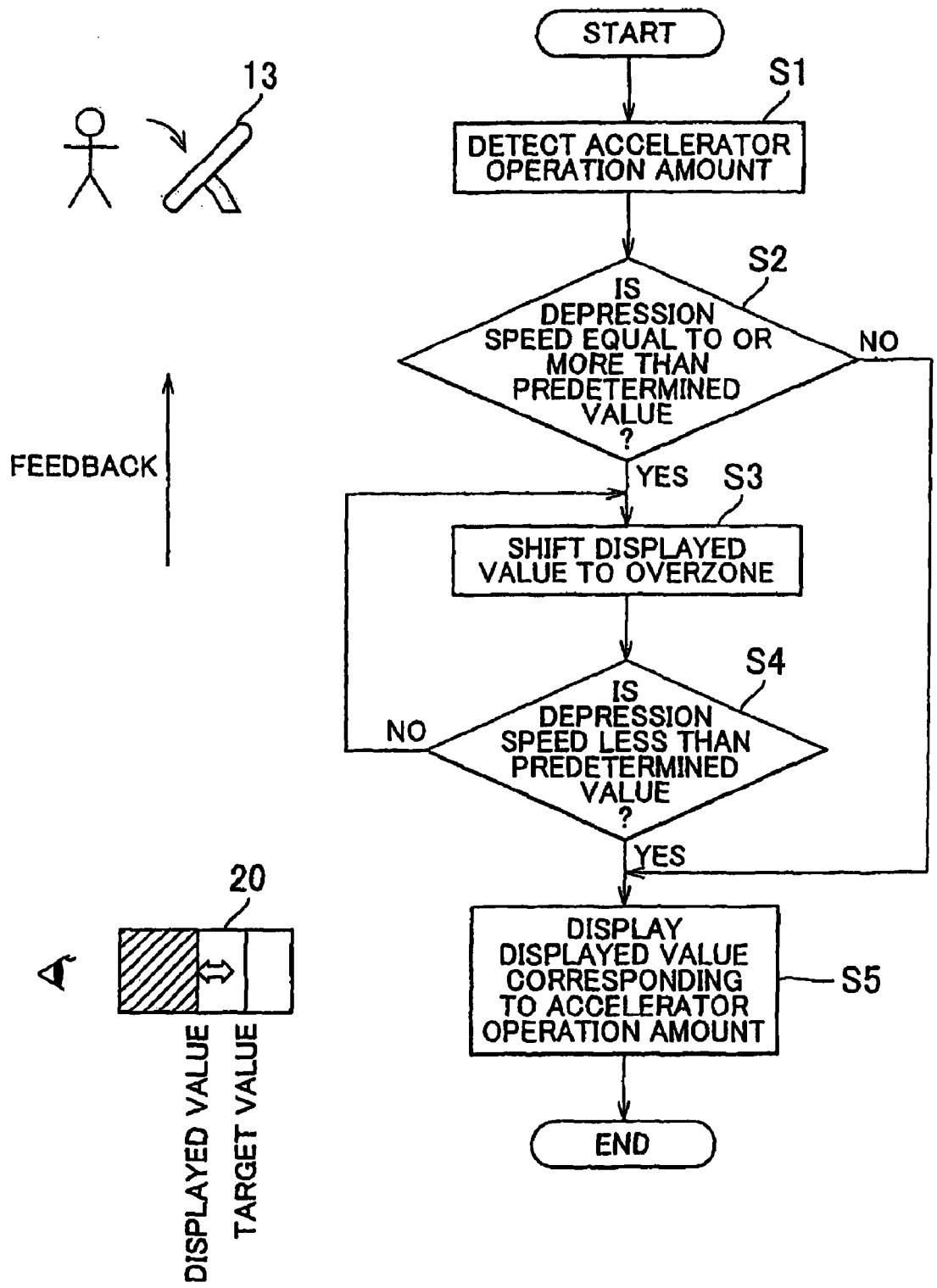
FIG. 13 is a flowchart of the procedure for the fuel economy improvement assist device in accordance with the present invention to display the display value on overzone in the accelerator operation amount indicator.

FIG. 13 is a flowchart of the procedure for the fuel economy improvement assist device 1 to display the displayed value on the accelerator operation amount indicator 20 utilizing the overzone.

When the driver operates the accelerator pedal 13, the ACC sensor 12 detects the accelerator operation amount (S1). The detected accelerator operation amount is sent to the engine ECU 14 at predetermined intervals. The engine ECU 14 sets the target accelerator operation amount 14a according to the accelerator operation amount and the vehicle speed, and sends the accelerator operation amount and the target accelerator operation amount 14a to the meter ECU 15.

The accelerator operation amount display control means 15a determines whether the accelerator pedal depression speed is equal to or more than a predetermined value (S2). An excessive accelerator pedal depression speed is detected when, for example, the accelerator pedal depression speed da/dt calculated based on N accelerator operation amount stored after acquisition at each cycle time equals or exceeds the predetermined value.

If the accelerator pedal depression speed is below the predetermined value (NO in S2), the accelerator operation amount display control means 15a displays a displayed value that correspond to the accelerator operation amount on the accelerator operation amount indicator 20 (S5).

If the accelerator pedal depression speed is equal to or exceeds the predetermined value (YES in S2), the accelerator operation amount display control means 15a shifts the displayed value to the overzone (S3). After the shift, the displayed value is obtained by increasing the displayed value immediately after the shift by an amount according to the increase in the accelerator operation amount.

The driver recognizes that the displayed value has suddenly entered the overzone, and senses as if the accelerator operation amount had increased suddenly. Such display can strongly attract the attention of the driver, and minimize the reduction in fuel economy.

Then, if the accelerator pedal depression speed falls below the predetermined value (YES in S4), the accelerator operation amount display control means 15a displays a displayed value that corresponds to the accelerator operation amount, which is outside the overzone, on the accelerator operation amount indicator 20 (S5). The period over which the driver maintains an accelerator pedal depression speed that is equal to or exceeds the predetermined value is not expected to be very long. Therefore, the displayed value is normally displayed in the overzone only momentarily, preventing the driver from feeling a sense of discomfort while attracting sufficient attention. In contrast, if an accelerator pedal depression speed that is equal to exceeds the predetermined value is maintained for only a short period, the driver may not have a chance to view it. Therefore, the displayed value corresponding to the accelerator operation amount may be displayed on the accelerator operation amount indicator 20 when a predetermined period elapses after the accelerator pedal depression speed falls below the predetermined value.

As described above, it is possible to more effectively restrict the accelerator pedal depression speed by displaying the displayed value actively utilizing the overzone.

Although simply the displayed value corresponding to the accelerator operation amount is displayed in step S5 of FIG. 13, the accelerator pedal depression speed determined based on the equation (1) or (2) may be reflected in the displayed value in step S5. In this case, two thresholds, namely a first predetermined value and a second predetermined value, which is lower than the first predetermined value, are provided, and the displayed value according to the accelerator operation amount is displayed when the accelerator pedal depression speed is below the first predetermined value, the displayed value with the accelerator pedal depression speed reflected is displayed when the accelerator pedal depression speed is equal to or exceeds the first predetermined value but less than the second predetermined value, and a displayed value that is shifted to the overzone is displayed when the accelerator pedal depression speed exceeds the second predetermined value. By controlling the displayed value in this manner, it is possible to have the accelerator pedal depression speed reflected in the displayed value, and occasionally to suddenly shift the displayed value to the overzone to strongly attract attention.

As has been described above, the fuel economy improvement assist device 1 in accordance with this embodiment indicates to the driver the possibility of reduced fuel economy and the amount by which the fuel economy may be reduced, and to guide the driver to a recommended region where low fuel consumption driving is possible, by greatly changing the displayed value when the accelerator pedal 13 depression speed is fast.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. A fuel economy improvement assist method to display, on a display device, a target value that corresponds to a target accelerator operation amount and a deviation value of an accelerator operation amount from the target accelerator operation amount, comprising the steps of:
   detecting the accelerator operation amount;
   calculating an accelerator depression speed based on the detected accelerator operation amount; and
   displaying the deviation value variably in accordance with the calculated accelerator depression speed on the display device.

2. The fuel economy improvement assist method according to claim 1, characterized by further comprising:
   determining whether the accelerator depression speed is equal to or above a predetermined value; and
   increasing a change amount of the deviation value when it is determined that the accelerator depression speed is equal to or above the predetermined value.

3. A fuel economy improvement assist device comprising:
   an accelerator operation amount detection portion that detects an accelerator operation amount; and
   a display control portion that displays, on a display device, a target value corresponding to a target accelerator operation amount and a deviation value of the detected accelerator operation amount from the target accelerator operation amount, and calculates an accelerator depression speed based on the detected accelerator operation amount, and variably displays the deviation value of the detected accelerator operation amount in accordance with the calculated accelerator depression speed.

4. The fuel economy improvement assist device according to claim 3, wherein
   if the accelerator depression speed from a first accelerator operation amount to a second accelerator operation amount beyond the first accelerator operation amount is equal to or above a predetermined value, the display control portion increases a change amount from a deviation value of the first accelerator operation amount with respect to the target accelerator operation amount to a deviation value of the second opening operation amount with respect to the target accelerator operation amount.

5. The fuel economy improvement assist device according to claim 3, wherein
   when the accelerator depression speed from a first accelerator operation amount to a second accelerator operation amount beyond the first accelerator operation amount is equal to or above a predetermined value, the display control portion displays a greater deviation value of an accelerator operation amount detected when it has been determined that the accelerator depression speed is equal to or above the predetermined value, than the target value corresponding to the target accelerator operation amount.

6. The fuel economy improvement assist device according to claim 3, wherein
   if the accelerator depression speed from a first accelerator operation amount to a second accelerator operation amount beyond the first accelerator operation amount is equal to or above a predetermined value, the display control portion displays a greater deviation value of an accelerator operation amount detected within a prescribed period after it has been determined that the accelerator depression speed is equal to or above the predetermined value, than the target value corresponding to the target accelerator operation amount.

7. The fuel economy improvement assist device according to claim 3, wherein
   the display control portion variably displays the deviation value reflecting a torque transmission loss in a torque converter of a transmission.

8. The fuel economy improvement assist device according to claim 7, wherein
   if the accelerator depression speed causes lock-up release of the torque converter, the display control portion variably displays the deviation value reflecting a torque transmission loss due to the lock-up release.

9. The fuel economy improvement assist device according to claim 3, wherein
   if the accelerator depression speed is below a first predetermined value, the display control portion displays a first deviation value that corresponds to the detected accelerator operation amount;
   if the accelerator depression speed is between the first predetermined value and a second predetermined value, the display control portion displays a second deviation value that corresponds to the detected accelerator operation amount reflecting the accelerator depression speed; and
   if the accelerator depression speed is equal to or above the second predetermined value, the display control portion displays a third deviation value that corresponds to the detected accelerator operation amount reflecting the accelerator depression speed in a region where a fuel consumption increases abruptly.

* * * * *